(No Model.)
O. TABER.
HARNESS SADDLE.
No. 463,998. Patented Nov. 24, 1891.
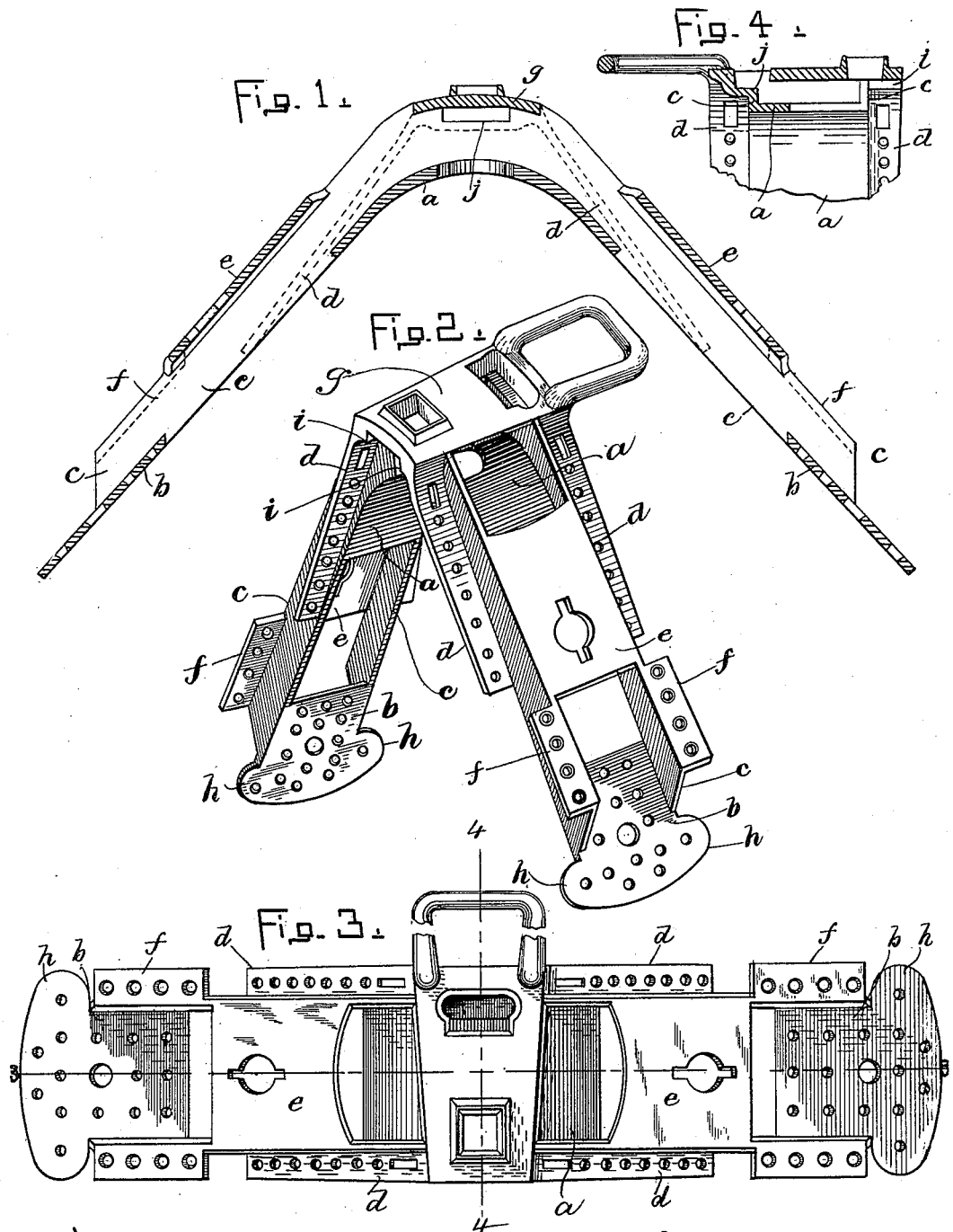
Witnesses:
A. D. Harrison.
B. A. McShane.
Inventor:
Orrin Taber
by Wright Brown Moseley
Attys

UNITED STATES PATENT OFFICE.

ORRIN TABER, OF NASHUA, NEW HAMPSHIRE, ASSIGNOR TO THE NASHUA SADDLERY HARDWARE CO.

HARNESS-SADDLE.

SPECIFICATION forming part of Letters Patent No. 463,998, dated November 24, 1891.

Application filed July 13, 1891. Serial No. 399,295. (No model.)

*To all whom it may concern:*

Be it known that I, ORRIN TABER, of Nashua, in the county of Hillsborough and State of New Hampshire, have invented certain new and useful Improvements in Saddle-Trees, of which the following is a specification.

My invention is not limited to any form of saddle-tree, but can be applied to any form now on the market, but more particularly to that form of saddle-tree known as the "running back-band" tree.

The objects of my invention are, first, to provide a smooth curved surface for the back-band to rest upon when a running back-band is used; secondly, to prevent the bolts or screws which secure the jockey and check-rein hook to the saddle-tree from coming in contact with the horse's back, and, thirdly, to provide means for more securely fastening the skirt to the saddle-tree, the construction and arrangement being such as to prevent the skirt from being torn away from the saddle-tree, an objection which in other saddle-trees has always existed, the connection of the skirt to the saddle-tree having heretofore been considered the weakest point.

To these ends the invention consists in the improvements which I will now proceed to describe and claim.

Of the accompanying drawings, forming a part of this specification, Figure 1 is a longitudinal vertical section of my improved saddle-tree through line 3 3 of Fig. 3, and shows the bridges over which the back-band is passed. Fig. 2 is a perspective view. Fig. 3 is a top plan view. Fig. 4 is a cross-section on line 4 4 of Fig. 3.

In the drawings, *c c* represent the raised sides of the saddle-tree, the same being connected on the under side by the bridges *a* and *b b* and on the upper side by terret-bridges *e e* and the bridge *g*, which supports the check-rein hook. Extending outwardly from each side of the sides *c c* are flanges *f f f f*. The bridges *b b* are provided at their lower ends with extensions having rounded ends *h h*.

It will be seen by the drawings that the bridge *a* presents a smooth curved surface for the back-band to rest upon, presenting no corners to cut or chafe the back-band. Said bridge also strengthens the tree at its weakest point and prevents the bolt that secures the jockey and check-rein hook to the tree from coming in contact with the horse's back. The flanges *d d d d* start from the bridge *g* and end at the under edges of the raised portions *c c* about half-way between the end and center of the tree. The flanges *f f f f* are located upon the upper edges of the raised portions *c c* of the tree, and extend upwardly from the ends of the tree to within about half an inch of the lower ends of the flanges *d d d d*.

A back-band may be used in two ways, one of which is to pass the back-band over the bridges *b a* and *b* and under bridges *e g* and *e*. The other method is to make the back-band in two parts and pass said parts over the bridges *b b* and secure their upper ends by the terrets to the bridges *e e*.

The object of the described arrangement of the flanges *d* and *f* is to permit the more secure fastening of the skirt of the saddle to the tree. The skirt is fastened in the following manner. A section of leather is sewed to each side of the skirt, the latter being of sufficient width so that said section is passed under the flanges *f f f f* and over the flanges *d d d d*, and secured thereto by nails passing through nail-holes in said flanges and into the leather. The sections of leather pass over the extensions *h h h h*. It will be seen that the nails are not wholly depended upon to prevent the skirt from being torn away from the tree, as the flanges *f f f f*, bearing on the outer surfaces of the leather, prevent the skirt from being lifted up and torn from flanges *d d d d*, while the projecting portions *h h h h* prevent the skirt from sagging downward.

I do not limit myself to the form of tree here shown, as my improvement may be applied to any other suitable form.

The saddle-tree has formed on its under side two shoulders *i i* and a lip *j*, and the check-rein hook has an extended shank that occupies a position between the shoulders, its end resting on said lip, a suitable fastening being provided for the hook; but I do not herein claim said features, excepting as combined with the curved strengthening-bridge *a* on the under side of the saddle-tree and the raised sides *c c*.

I claim—

1. A saddle-tree having a strengthening-bridge $a$ upon the under side thereof, the continuous raised portions $c\ c$, the shoulders $i\ i$, and the lip $j$, as and for the purpose specified.

2. A saddle-tree having a strengthening-bridge $a$ upon the under side thereof, the continuous raised portions $c\ c$, and the flanges $d$ and $f$ thereon, as and for the purpose set forth.

3. A saddle-tree having a strengthening-bridge $a$ upon its under side, the continuous raised portions $c\ c$, the flanges $d$ and $f$, the bridges $b\ b$ on its lower extremities, and the flanges $h$ on the bridges $b\ b$, as and for the purpose specified.

In testimony whereof I have signed my name to this specification, in the presence of two subscribing witnesses, this 7th day of July, A. D. 1891.

ORRIN TABER.

Witnesses:
CLARENCE F. PALMER,
RICHARD P. ELLIOTT.